United States Patent

Baker

[15] 3,638,320
[45] Feb. 1, 1972

[54] DRAFTING MACHINE SCALE LOCKING DEVICE

[72] Inventor: Allister L. Baker, Denville, N.J.
[73] Assignee: Keuffel & Esser Company, Morristown, N.J.
[22] Filed: May 22, 1970
[21] Appl. No.: 39,845

[52] U.S. Cl. .........................................................33/79 R
[51] Int. Cl. ................................................B43l 13/02
[58] Field of Search ...................... 33/79, 76, 114, 173

[56] References Cited

UNITED STATES PATENTS

| 1,102,192 | 6/1914 | Hardsocg | 33/114 |
| 2,029,899 | 2/1936 | Stahl | 33/79 X |

FOREIGN PATENTS OR APPLICATIONS

| 362,703 | 9/1938 | Italy | 33/79.1 |
| 685,014 | 12/1939 | Germany | 33/79 R |

*Primary Examiner*—Harry N. Haroian
*Attorney*—J. Russell Juten, Peter F. Willig, Lionel N. White and Milford A. Juten

[57] ABSTRACT

The jam-fit connection between the tapered channel of a drafting machine protractor head scale arm and a like-tapered chuckplate of a drafting scale or rule is relieved by a split in the channel portion of the scale arm. A detachable retainer clip laterally containing the split portion of the scale arm ensures a firm union between the scale arm and the scale chuckplate during drafting operations, yet may readily be removed to allow the channeled portion of the scale arm to spread and release the engaged scale chuckplate. Scales may thus be readily removed and replaced without excessive force being applied to the protractor head.

7 Claims, 6 Drawing Figures

INVENTOR.
ALLISTER L. BAKER

BY Lionel N. White

ATTORNEY

INVENTOR.
ALLISTER L. BAKER

BY Lionel N. White

ATTORNEY

DRAFTING MACHINE SCALE LOCKING DEVICE

BACKGROUND OF THE INVENTION

Drafting machines have, for the most part, replaced the T-square and triangle tools throughout the commercial drafting field. Such drafting machines are of two general types, the retroflex type shown in U.S. Pat. No. 3,339,285 and the orthogonal track-type device shown in U.S. Pat. No. 3,316,644. Although drafting machines may vary considerably in overall design, they regularly include a protractor head which incorporates a pair of rectilinearly disposed arms to which drafting scales or rules may be attached. The function of a protractor head is to enable the movement of these scale arms and attached scales through any number of preset or selected angular increments during the preparation of an engineering drawing or the like.

Exchange or replacement of drafting scales during the preparation of a drawing is not an uncommon procedure. Thus, it is desirable to provide a ready means for interchange of such scales and a widely used method is to provide a closely mated pair of tapered fittings, for example a channel in the protractor head scale arm, and a chuckplate which is firmly attached to the drafting scale. Since the scale must be immovably engaged with the protractor head throughout drafting operations in order to maintain proper parallelism in drawn lines, the fitting of the tapered chuckplate into the like-tapered scale arm channel is particularly close matched. As a result, while scale removal requires only a direct pulling force, as opposed to the removal of screws or the like, the tapered fit is extremely resistant to such force. A considerable amount of pulling and rocking of the protractor heat is often the result of an attempt to remove a well-engaged scale, and the critical alignments in the protractor head and the drawing machine itself are, thus, often endangered.

Attempts have been made to overcome the natural resistance of the scale chuckplate to removal from a well-fitting scale arm channel. For example, a cam-type wrench device often provided with many drafting machines may be employed in cooperation with a chuckplate screw head to initially break the tight taper fit. While such a wrench generally functions satisfactorily, it often becomes misplaced or excessively worn due to repeated camming action. Another attempt to overcome the problem has been described in Swiss Pat. No. 248,009 wherein one sidewall of the scale arm-receiving channel is made separate from the other and after insertion of the scale chuckplate is pulled into engagement by means of a builtin camming action. Such an arrangement is particularly susceptible to misalignment due to wear and, further, fails to provide the positive mating of a firm close-tolerance tapered fit.

SUMMARY

According to the present invention means are provided in a drafting machine for maintaining a close-fitting engagement between a drafting scale and a protractor head scale arm during periods of use while affording a yielding release of such engagement for the ready removal and interchange of drafting scales.

In order to achieve such a result, a tapered channel, preferably with internally beveled sidewalls, is machined in the under face of the protractor head scale arm in the common manner and then the body of the channeled scale arm which receives the close-fitting tapered scale chuckplate is divided along a substantial part of the length of the channel, such as by a splitting or slot. The effect of the slot is to weaken the end of the scale arm and allow an expansion in the lateral dimension of the machined channel in response to the outward movement of force exerted on the sidewalls of channel by a mated tapered chuckplate. A retainer clip element is provided, however, which overlies the end of the scale arm and closely engages the outer edges of the arm, thereby containing the width of the arm and maintaining the original cross section dimension of the tapered channel of the scale arm.

With the retainer clip in position, a scale chuckplate may be inserted into the channel and will be retained in the usual close-tolerance jam-fit commonly achieved with the prior scale attaching arrangements. Removal of the retainer clip element allows a minute expansion to occur at the split portion of the scale arm, thereby relieving the close taper fit between the scale arm channel and the scale chuckplate. The scale then may be easily removed without reliance upon camming wrenches or the like, or without the use of excessive force, thereby ensuring protection for delicate parts of the drafting machine. Replacement of the retainer clip thereafter immediately establishes an unyielding and close-fitting dimension in the tapered scale arm channel so that a simple press-fitting insertion of a tapered scale chuckplate effects a firm engagement of a scale with the protractor head.

DRAWINGS

In the drawings FIG. 1 shows a common protractor head and scale arrangement of the prior art;

FIG. 2 shows a partial view of a drafting machine protractor head and scale arrangement according to an embodiment of the present invention;

FIG. 3 presents a side view of the portion of a protractor head scale arm and drafting scale embodying the present invention and depicts the operation of an embodiment of the invention;

DESCRIPTION

Figure 1:
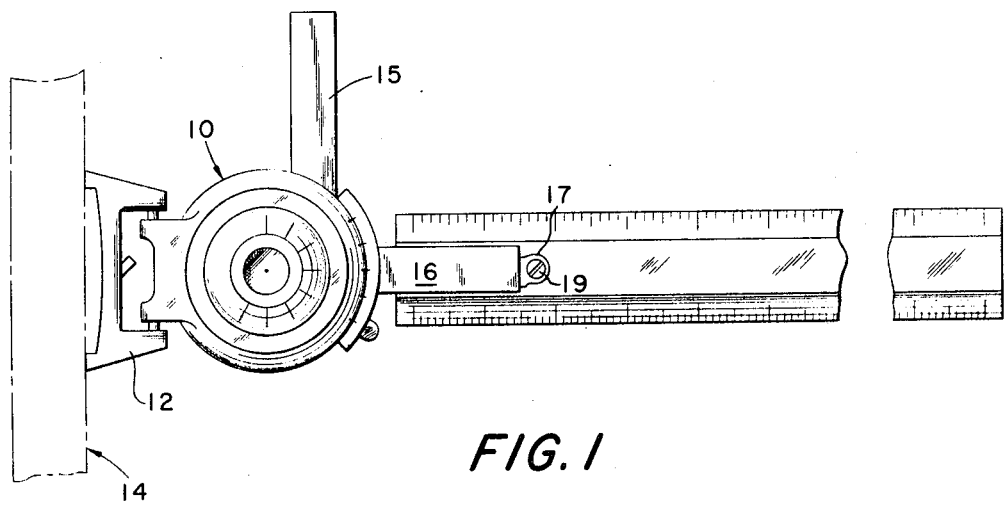

Drafting machines in present use for the most part employ a mechanically graduated protractor head which includes orthogonally disposed arms to which drafting scales are firmly mounted. The drafting machines allow for movement of the protractor head over substantially the whole of a drafting board surface while retaining parallelism in the straightedge of a particular drafting scale regardless of its position on the board. Through operation of the protractor head, however, the angular disposition of a drafting scale straightedge may be varied with respect to the baseline of a drawing in preset increments, usually of about 15°, or through any range of selective angular increments. With reference to FIG. 1 of the drawing a protractor head is generally shown at 10. The head 10 is attached to the drafting machine proper (not shown) such as through a hinged connection to a yoke 12. Through the operation of the drafting machine this yoke 12 is free to travel over the surface of the underlying drawing board (not shown) by means, for example, of a carriage mounted to the vertical arm of a track-type drafting machine. Such a vertical arm or rail is shown in phantom at 14.

Scale arms 15, 16 are mounted on the movable portion of head 10 and may be placed in any selected angular disposition with respect to head 10 as previously described. Either or both of scale arms 15, 16 will normally mount a drafting scale 18; however, for the sake of simplicity, only the horizontal scale arm 16 has thus been shown. It will, of course, also be recognized that the present invention is intended for use on any number of scale arms whether they be horizontally or vertically disposed.

In present drafting machines attachment of a scale 18 to a scale arm 16 is accomplished by means of a close-fitting, dovetail union between a tapered bevel-walled channel on the underside of arm 16 and a tapered bevel-edged chuckplate 17 which is firmly attached to scale 18 by screw means 19. In order to break the snug, dovetail fit between chuckplate 17 and the channel in scale arm 16, the head of screw 19 is often employed as a fulcrum for a cam-type wrench.

Figure 2:
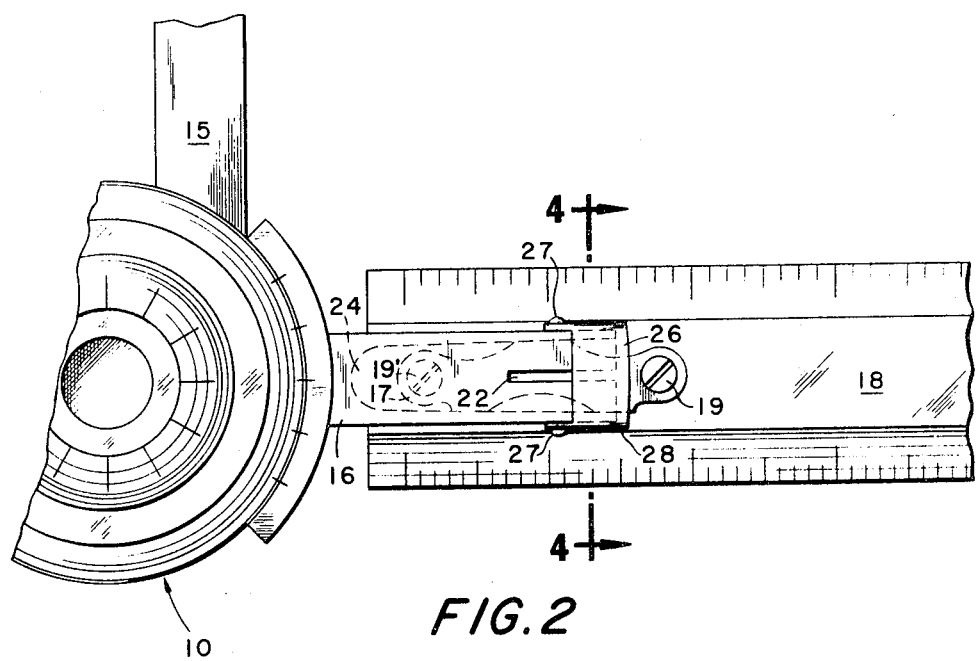

An embodiment of the present invention is shown in greater detail in FIG. 2. Scale arm 16 is machined in its under face in the usual manner to form a tapered channel 24. A slit 22 is cut longitudinally of scale arm 16 intermediate the sidewalls of channel 24 and serves to weaken or reduce the rigidity of the outermost end of scale arm 16.

A retainer clip 26 is provided which snugly overlies the slit end of scale arm 16 and, when in such a position, provides a strengthening of the end of arm 16 and in effect ensures that the outermost end of channel 24 retains its original dimension and cannot be spread by later insertion of a scale chuckplate. Retainer clip 26 is of a generally channel-shaped cross section and may be constructed of any rigid material such as metal or plastic. Clip 26 is dimensioned to laterally span arm 16 in such a manner that the inner faces of sidewalls 28 closely engage the outer edges of arm 16 when the arm is in a nonoperating condition, that is when no scale chuckplate is inserted therein. Where, as is most common, the edges of arm 16 are substantially parallel, the inner faces of sidewalls 28 of clip 26 are likewise substantially parallel to one another, since in the function of the invention there is no necessity, nor is it particularly desirable, that sidewalls 28 impart a camming action to the end of arm 16. In the present embodiment a portion of sidewalls 28 are extended to form leg sections which loosely lie along the edges of arm 16 and accommodate pin or detent means 27, 27' and provide a means for hingedly attaching clip 26 to arm 16. Although not necessary to the operation of the invention, these hinge means provide for ready accessibility of clip 26 and ensure against inadvertent misplacement of this clip element.

Figure 3:
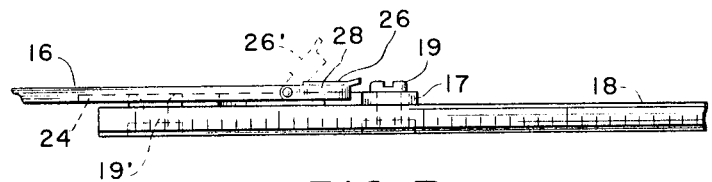
Figure 4:
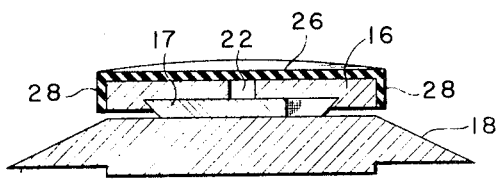
FIG. 4 is a view in section taken at 4—4 of FIG. 2.

In operation of the device in the present invention, the retainer clip 26 is positioned to closely overlie the end of scale arm 16 as shown in FIG. 3. With the end of scale arm 16 thus rigidly contained, chuckplate 17 with its firmly attached scale 18 is inserted into the scale arm channel 24 in the usual manner. The resulting close-fitting dovetail connection may be seen in cross section in FIG. 4. When it is desired to remove scale 18, the retainer clip is disengaged from the end of scale arm 16, such as to a position 26' in FIG. 3. The outward movement of force exerted on the channel walls by the taper of chuckplate 17 then forces scale arm 16 and its channel 24 to spread slightly at the portion weakened by slit 22, thus breaking the tight, dovetail fit. The application of a slight longitudinal force on scale 18 is then sufficient to disengage chuckplate 17 from channel 24.

Figure 5:
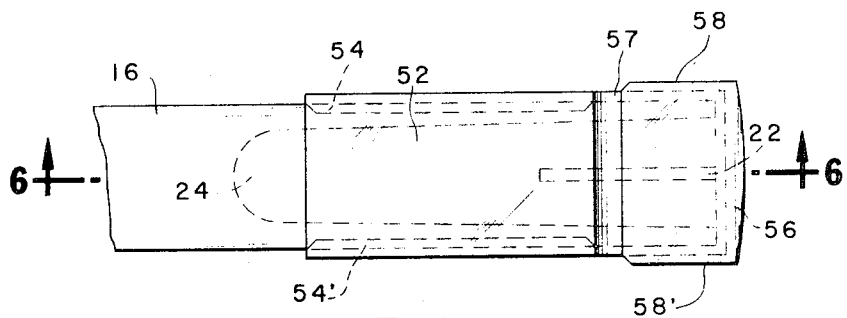
FIG. 5 shows an additional embodiment of the retainer clip element of the invention.
Figure 6:
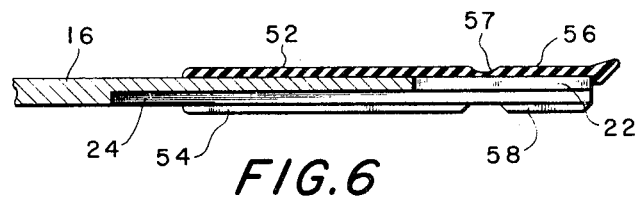
FIG. 6 is a view in section taken at 6—6 of FIG. 5.

Another embodiment of a retainer clip according to the present invention may be seen in FIGS. 5 and 6 and comprises a one-piece element constructed of a substantially rigid plastic, such as polypropylene. The retainer clip comprises a body section 52 and a tongue section 56 joined in a single molded part by a self-hinge portion 57 of reduced thickness and thus greater flexibility. Body portion 52 is generally of channel shape with downwardly extending walls paralleling the edges of scale arm 16. The walls of body 52 may advantageously terminate in ribbed portions 54, 54' which underlie the edge portions of scale arm 16. Thus, the body portion of the clip element may be readily snapped onto the body of scale arm 16 and retained in position by ribbed portions 54, 54'. Tongue portion 56 of the clip element similarly includes sidewall portions 58, 58' which, however, more closely engage the sides of scale arm 16 than do wall portions of body 52 in order to perform the function of reinforcing the split end of arm 16 and thus maintain the inner dimension of channel 24. Due to the more flexible nature of hinge section 57, tongue portion 56 may be lifted from engagement with the end of arm 16 to effect the release of scale chuckplate 17.

The above embodiments have been presented for the purpose of illustration and should not be taken to limit the scope of the present invention. It will be apparent that the described embodiments are capable of many variations and modifications which are likewise to be included within the scope of the present invention as set forth in the appended claims.

What is claimed:

1. In a drafting machine comprising a protractor head including an outwardly extending arm member adapted to receive and firmly engage the chuckplate of a drafting scale, the improvement comprising means for establishing a rigid yet readily disengageable connection between said arm member and said drafting scale chuckplate, said improvement comprising:
   a. a protractor head arm member having defined therein a tapered longitudinal channel;
   b. means rendering at least a portion of said arm member laterally yieldable whereby a lateral moment of force applied outwardly at the sidewalls of said channel results in an expansion of the normal width of said channel; and
   c. retainer means adapted to removably engage the lateral edges of said arm member and immobily contain the expandability of said channel against said lateral force moment, whereby during such engagement of said retainer means insertion into said tapered channel of a like-tapered drafting scale chuckplate effects a rigid wedge-fit union between said chuckplate and said arm member, and upon disengagement of said retainer means said channel expands in its lateral dimension in response to the force exerted at its sidewalls by the taper of said chuckplate, thereby effecting a release of said chuckplate from said wedge-fit union.

2. The improvement according to claim 1 wherein said arm member comprises a generally flat elongate plate having a channel therein tapering outwardly to the free end of said arm member, the body of said arm member being split intermediate the sidewalls of said channel for a substantial distance from said free end thereby rendering at least that portion of said arm member immediate its free end laterally yieldable to force applied outwardly at the sidewalls of said channel.

3. The improvement according to claim 2 wherein said arm member comprises a relatively thin rectilinear plate of substantial width between parallel side edges and wherein said retainer means comprises a rigid channel member having parallel inner sidewall portions, said channel member being dimensioned to laterally span and closely engage said arm member side edges at the respective inner surfaces of said channel member sidewall portions.

4. The improvement according to claim 3 wherein said channel member is hingedly attached to said arm member for reciprocal movement into and out of said engagement with said arm member side edges.

5. The improvement according to claim 3 wherein said retainer means comprises a body portion affixed to said arm member and wherein said channel member is hingedly attached to said body portion for reciprocal movement into and out of said engagement with said arm member side edges.

6. In a drafting machine having a protractor head, the improvement in means for detachably affixing a drafting scale to said protractor head comprising:
   a. an arm member attached to said head and extending therefrom, said arm member comprising a relatively thin rectilinear plate of substantial width between its side edges having defined therein at one of the wider faces thereof and intermediate said side edges an open longitudinal channel tapering outwardly to the free end of said arm member, said arm member being longitudinally divided intermediate the sidewalls of said channel for a substantial distance from said free end, thereby rendering at least that portion of said arm member immediate said free end laterally yieldable to force applied outwardly at the sidewalls of said channel; and
   b. retainer means adapted to reciprocally engage and disengage said arm member side edges and immobily contain said arm member against laterally yielding to said outwardly applied force, whereby during such engagement of said retainer means insertion into said tapered channel of a drafting scale chuckplate of matching taper effects a rigid wedge-fit union between said chuckplate and said arm member, and upon disengagement of said retainer means said arm member is rendered capable of laterally yielding to the force applied outwardly at the sidewalls of said channel by the taper of an inserted chuckplate, thereby allowing a lateral expansion of said channel and release of said chuckplate from said rigid wedge-fit union.

7. The improvement according to claim 6 wherein said arm member side edges are substantially parallel and said retainer means comprises a rigid channel member having substantially parallel inner sidewall portions, said channel member being dimensioned to laterally span and closely engage said arm member side edges at the respective inner surfaces of said channel member sidewall portions.

* * * * *